United States Patent
Petrovic et al.

(10) Patent No.: US 10,250,363 B2
(45) Date of Patent: Apr. 2, 2019

(54) COMMUNICATION SYSTEM WITH EXPANDABLE CAPACITY

(71) Applicant: Entropic Communications, Inc., San Diego, CA (US)

(72) Inventors: Branislav Petrovic, La Jolla, CA (US); Edward Warner, San Diego, CA (US); Michail Tsatsanis, Huntington Beach, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 623 days.

(21) Appl. No.: 14/511,997

(22) Filed: Oct. 10, 2014

(65) Prior Publication Data

US 2015/0373576 A1 Dec. 24, 2015

Related U.S. Application Data

(60) Provisional application No. 62/013,925, filed on Jun. 18, 2014.

(51) Int. Cl.
*H04L 12/801* (2013.01)
*H04L 5/00* (2006.01)
*H04W 48/12* (2009.01)

(52) U.S. Cl.
CPC ........... *H04L 5/0046* (2013.01); *H04L 5/006* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 5,682,419 A * | 10/1997 | Grube | ................. | H04L 27/2608 370/329 |
| 9,014,244 B2 * | 4/2015 | Clausen | ................ | H04L 5/0042 375/222 |
| 9,838,545 B2 * | 12/2017 | Clausen | ................ | H04L 5/0042 |
| 2010/0254444 A1 * | 10/2010 | Clausen | ................ | H04L 5/0042 375/220 |
| 2014/0016558 A1 * | 1/2014 | Lawry | ................... | H04L 5/0046 370/328 |
| 2014/0161092 A1 * | 6/2014 | Seo | ........................ | H04L 5/0053 370/329 |
| 2015/0195818 A1 * | 7/2015 | Davydov | ............ | H04L 27/3494 370/329 |

* cited by examiner

*Primary Examiner* — Willie J Daniel, Jr.
(74) *Attorney, Agent, or Firm* — McAndrews, Held & Malloy, Ltd.

(57) ABSTRACT

Systems and methods for expanding capacity in a network without the use of frequency gaps between a legacy channel and/or newly added channels are provided. Systems and methods for maintaining legacy node operability in the expanded capacity network are also provided by determining the increased power experienced by a legacy node as a result of the newly added channels, and dynamically adapting the modulation utilized on the legacy channel commensurate with the increased power.

16 Claims, 8 Drawing Sheets

COMMUNICATION SYSTEM WITH EXPANDABLE CAPACITY

CROSS-REFERENCE TO RELATED APPLICATIONS

This application claims the benefit of U.S. Provisional Application No. 62/013,925 filed Jun. 18, 2014, titled Communication System with Expandable Capacity, which is incorporated herein by reference in its entirety.

TECHNICAL FIELD

The present disclosure relates generally to communication systems. In particular, some embodiments provide systems and methods for expanding the capacity of a communication system while achieving optimum spectral efficiency and maintaining compatibility with legacy nodes.

BACKGROUND

In many communications applications, it is desirable to send as much information as possible and as fast as possible. That is, where a network may initially be deployed with, e.g., two nodes, or some other small number of nodes, it may be desirable to increase the capacity of that network. Accordingly, additional nodes may be deployed within the network. As more nodes are deployed, more channels may be added in order to maintain the data throughput of the additional (and original/existing) nodes. Furthermore, data speeds and throughput demands may increase over time, thus necessitating the addition of even more channels.

Conventional systems and methods relying on multiple channels are limited, though, by the need for a frequency gap that is inserted between neighboring channels as a transition band and to allow for filtering. Such frequency gaps are required in order to reduce interference between such neighboring channels. However, the use of these frequency gaps reduces spectral efficiency, as the frequency gap cannot be utilized for the actual transmission of signals.

Additionally, network capacity expansion, as accomplished by conventional methods, often requires the replacement of legacy nodes that have been designed to operate in a single channel mode. That is, legacy nodes that are not capable of multi-channel operation must be replaced with nodes that have the capability of transmitting and receiving over two or more channels.

SUMMARY

The disclosed systems and methods are directed to expanding the capacity of a network. Capacity may be expanded by the addition of new network nodes as well as additional channels to support the increased number of network nodes. These additional channels can be added without the need to insert a frequency gap or guard band in between neighboring channels. Additionally, legacy nodes, configured to operate on, e.g., a single channel, can be retained and used, in some scenarios, in a slightly reduced capacity.

In accordance with one embodiment, a method comprises determining traffic conditions on a network. Depending on the traffic conditions, the bit loading is adjusted on at least one of a legacy channel and newly added channels of the network to maintain legacy node operability in the network, wherein newly added channels are added without a frequency gap. Adjusting the bit loading occurs in accordance with the following operations: operating the legacy channel at a full order of modulation; estimating an imbalance based on the probe; lowering the bit loading of the legacy channel to operate at a lowered order of modulation; and increasing the bit loading of the newly added channels.

In accordance with another embodiment, a method comprises launching transmissions on a legacy channel of a network without the presence of additional channels. The method further comprises determining a power output of a legacy node receiving the transmissions on the legacy channel, the legacy node being configured for operation solely on the legacy channel, and determining the spectral locations of the additional channels. Further still, the method comprises calculating an amount of spillover power into the additional channels based upon the power output of the legacy node on the legacy channel that reach the spectral locations of the additional channels.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the invention, which is defined solely by the claims attached hereto.

BRIEF DESCRIPTION OF THE DRAWINGS

Various embodiments are described in detail with reference to the following figures. The drawings are provided for purposes of illustration only and merely depict typical or example embodiments. These drawings are provided to facilitate the reader's understanding and shall not be considered limiting of the breadth, scope, or applicability of the present disclosure. It should be noted that for clarity and ease of illustration these drawings are not necessarily made to scale.

The figures are not intended to be exhaustive or to limit the various embodiments to the precise form disclosed. It should be understood that embodiments can be practiced with modification and alteration.

DETAILED DESCRIPTION OF VARIOUS EMBODIMENTS

Various embodiments are directed toward systems and methods for expanding the capacity of a network by adding new channels without a need to introduce any frequency gap between neighboring channels. Optimal, or at the least, much improved spectral efficiency can be achieved compared to single channel networks that have been expanded by the addition of new channels using conventional methods. Additionally, and to this end, legacy nodes (designed for single channel system operation) can be retained and adapted for operation in an expanded single channel system with a minimal effect on network efficiency.

An increasing use of communications networks is for content delivery to customer premises by service providers. For example, service providers may operate a hybrid Passive Optical Network (PON) and coaxial/coax network. The c.LINK Access networks derived from the MoCA (Multimedia over Coax Alliance) technology are one type of network used for such content delivery system. Described below are example networks in which various embodiments may be implemented.

Figure 1:
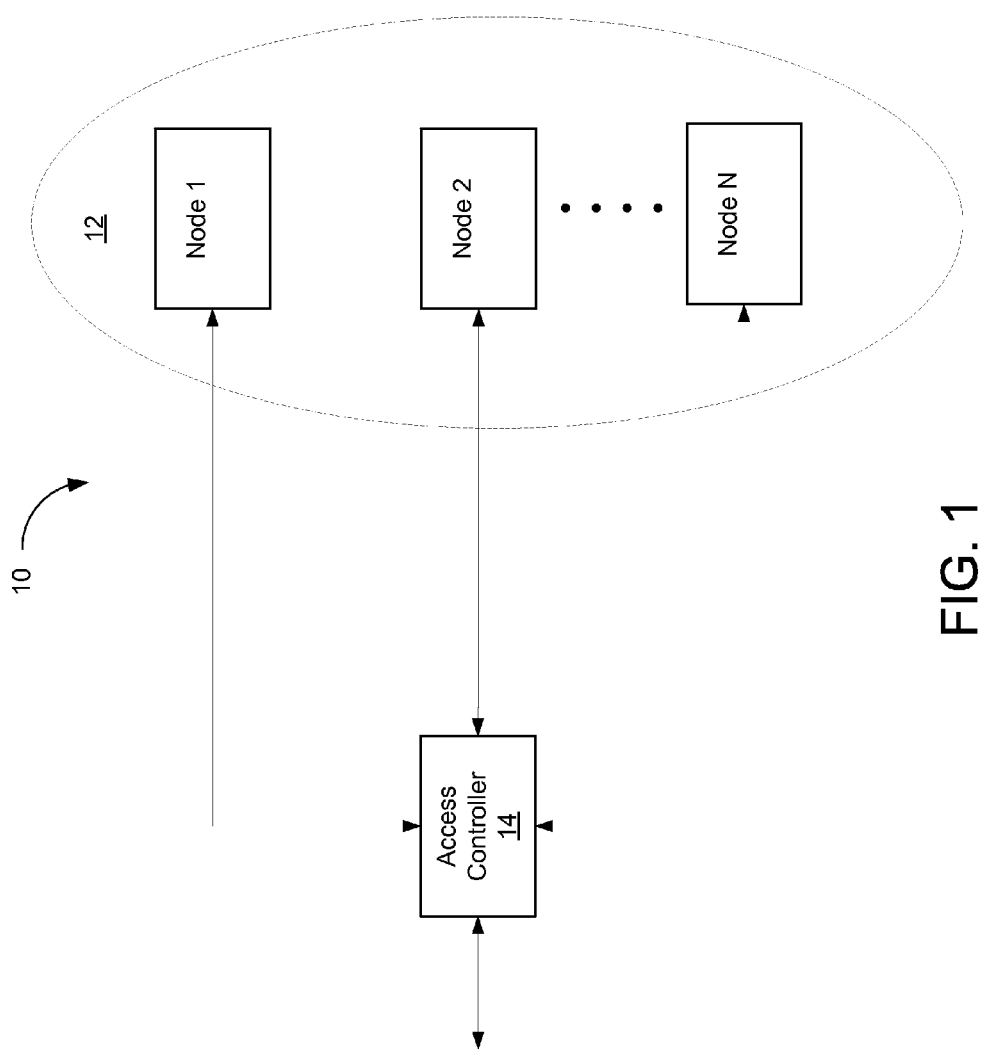
FIG. 1 illustrates an example access network using a point-to-multipoint topology within which various embodiments of the technology disclosed herein may be implemented.

FIG. 1 illustrates an example access network 10. In this access network, an access controller 14 is in communication with a plurality of network nodes 12, e.g., Node 1, Node 2, ..., and Node N. For example, access controller 14 may be an access network controller (NC) (sometimes referred to as a Network Coordinator) managed by an Operator/Service Provider (OSP) or Multiple System Operator (MSO), such as a cable company. Network nodes 12 may comprise various Customer Premise Equipment (CPEs), such as televisions, computers, high-speed data modems, set-top boxes, or other network connected content delivery systems.

Such an access network 10 may be arranged in a point-to-multipoint topology. In a point-to-multipoint topology, network nodes 12 communicate with access controller 14 and access controller 14 communicates with each of network nodes 12 (Node 1, Node 2, ..., Node N). However, network nodes 12 themselves may not necessarily communicate with each other. In access networks like c.LINK, hundreds of CPEs can be in communication with a single NC.

Figure 2:
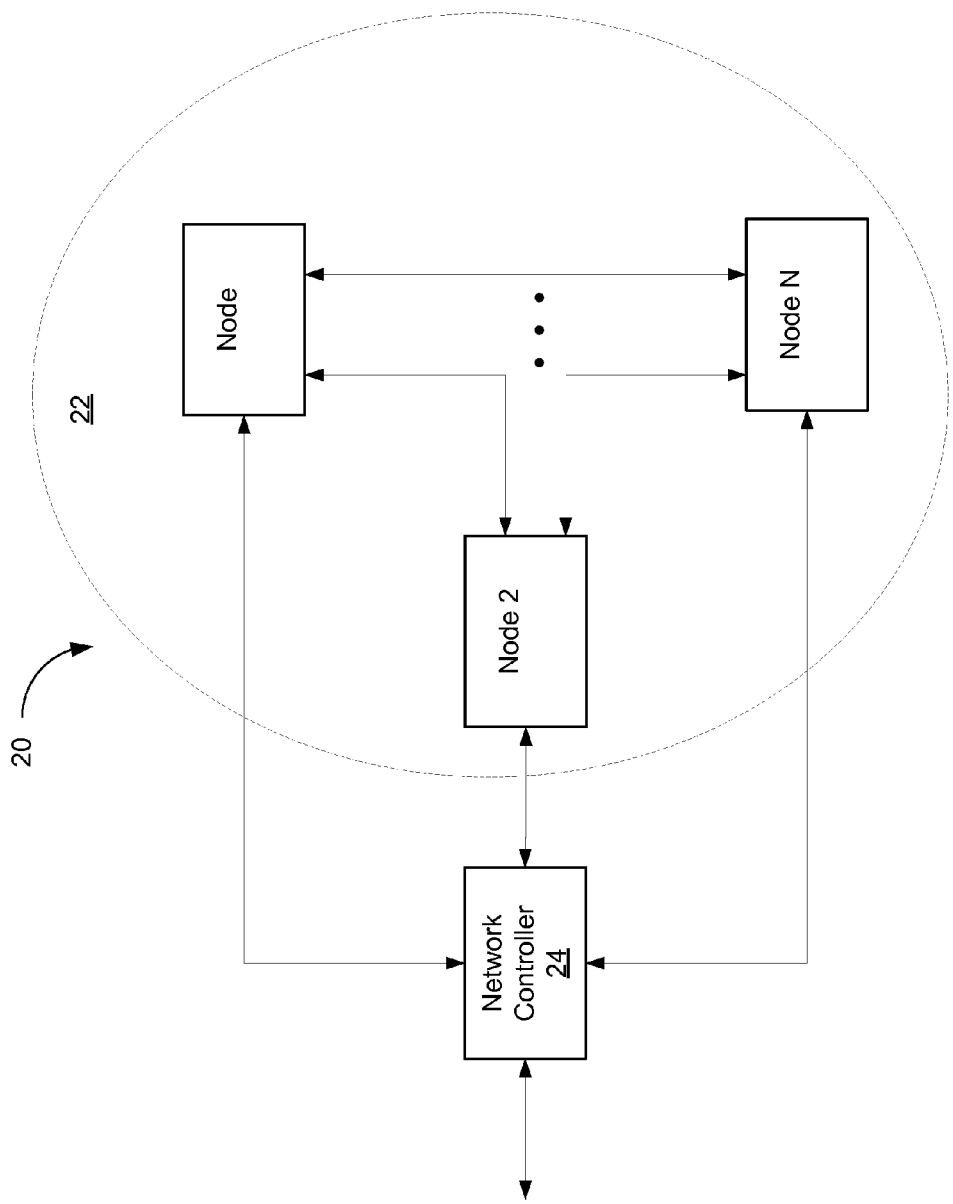
FIG. 2 illustrates another example access network using a mesh topology within which various embodiments of the technology disclosed herein may be implemented.

FIG. 2 illustrates another example network 20, where NC 24 is in communication with a plurality of network nodes 22, e.g., Node 1, Node 2, ..., and Node N. However, network 20 is arranged in using a mesh topology, where network nodes 22, unlike network nodes 12, are allowed to communicate with each other. MoCA in-home networks (HNs) similar to the MoCA standard use mesh topologies with multipoint-to-multipoint topologies, where multiple nodes can communicate with a plurality of other nodes.

In many communications networks, physical layer (PHY) packets are transmitted using orthogonal frequency division multiplexing (OFDM) for modulating data. OFDM is a digital multi-carrier modulation method in which a frequency band corresponding to a carrier comprises a number of closely spaced orthogonal subcarriers that are used to transport data. Data is divided into separate streams to be carried on the subcarriers. Each link between a pair of network nodes has a modulation profile in each direction that specifies the density of the modulation used on the subcarriers transmitted in that direction.

Each subcarrier is modulated using quadrature amplitude modulation (QAM). In QAM, the phases of two carrier waves at the same frequency are modulated. The two subcarriers are termed the quadrature (Q) component and the in phase (I) component. For example, in accordance with one modulation profile, a first subcarrier employs 16-QAM. In accordance with 16-QAM, 16 constellation points represent one of the 16 possible values that can be represented by a four bit binary information word. A second subcarrier employs a denser modulation, such as 64-QAM (having 64 possible constellation points, each representing one of the 64 possible values of a 6 bit information word). Each of the other subcarriers has a particular modulation density which may be greater than, less than, or the same as the first and second subcarriers.

In MoCA networks, binary phase shift keying (BPSK) and quadrature phase shift keying (QPSK) are considered less dense QAM modulation schemes and are also used. The denser a modulation profile, the less robust the communication. A more dense profile means more constellation points. In turn, more constellation points means more bits transmitting in the same amount of time. A signal that is transmitted using a more dense modulation scheme will be more susceptible to noise and other factors in the channel that can cause the packet error rate to be higher.

Figure 3:
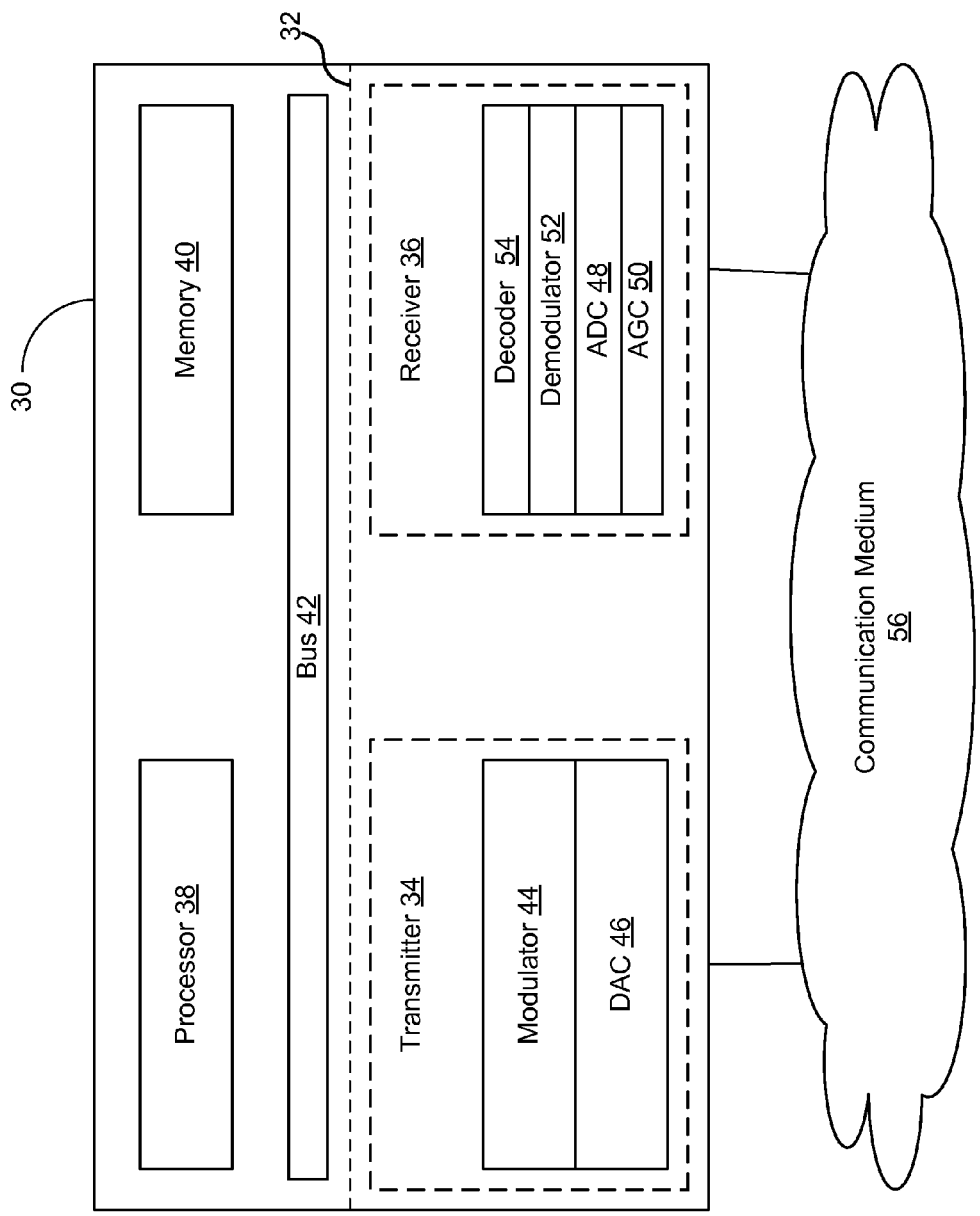
FIG. 3 illustrates a block diagram of an example network node.

FIG. 3 illustrates a simplified block diagram of one example of a network node 30. As shown in FIG. 3, network node 30 may include a physical interface 32 including a transmitter 34 and a receiver 36, which are in data communication with a processor 38 through a data bus 42. The transmitter 34 may include a modulator 44 for modulating data onto a plurality of OFDM subcarriers according to a quadrature amplitude modulation (QAM) scheme such as, for example, 8-QAM, 16-QAM, 32-QAM, 64-QAM, 128-QAM, or 256-QAM, to name a few, and a digital-to-analog converter (DAC) 46 for transmitting modulated signals to other network nodes through a communication medium 56. It should be noted that various embodiments presented herein may be described as operating with one or more orders of modulation. However, these descriptions are merely examples, and not intended to be limiting in any way, were other orders of modulation may be possible.

Receiver 36 may include an analog-to-digital converter (ADC) 48, which can be a broadband ADC, for converting a modulated analog signal received from another network node into a digital signal. Receiver 36 may also include an automatic gain control (AGC) circuit 50 for adjusting the gain of the receiver 36 to properly receive the incoming signal, a demodulator 52 for demodulating the received signal, and a decoder 54 for decoding parity check codewords such as, for example, low-density parity check (LDPC) codewords, BCH codewords, or codewords for another coding scheme. One skilled in the art will understand that the network node 30 may include additional circuitry and functional elements not described herein.

Processor 38 may be any central processing unit (CPU), microprocessor, micro-controller, or computational device or circuit for executing instructions. As shown in FIG. 3, the processor 38 is in signal communication with a memory unit 40 through data bus 42.

As described above, data packets are transmitted over a coaxial communication channel using OFDM, and the communication through the network is managed by a NC node. The NC may be any network node and may switch from node to node as nodes are added and removed from the network. The NC periodically broadcasts beacons and Media Access Plan (MAP) packets to the nodes connected to the network. The beacons are transmitted at regular intervals (e.g., every 10 ms) and identify the channel time clock (CTC), the MoCA network version, the time of the next admission control frame (ACF), and when a NC handoff will occur (e.g., when the NC changes from one network node to another network node). MAP packets are transmitted more frequently by the NC than are beacons and provide scheduling information that identify when each network node will be transmitting data through the network. The NC may receive reservation requests (RRs) from each of the plurality of nodes between MAP packet transmissions in which the network nodes report their transmission capabilities and request to transmit data to other network nodes.

It should be noted that as described herein, added channels in the context of various embodiments can refer to additional frequency "chunks" on/over which one or more network nodes may transmit and/or receive data For example, in DOCSIS, a standard that permits high-speed data transfer to an existing cable TV system (e.g., over a hybrid fiber-coaxial infrastructure), each additional channel may be a 6 MHz chunk/channel in the US. In some networks, a channel can have some frequency bandwidth, e.g., 192 MHz wide, where as little as 24 MHz portions of that channel (considered a subchannel) can be used. Once expanded with additional channels/frequency blocks, the network operates and feels as if it were a single homogenous channel, where the terms channel and extension are used interchangeably herein. Again, additional channels/frequency blocks can be of varying widths. As will be described in greater detail, some nodes (i.e., newer nodes) may operate on the entire expanded/extended channel, while some nodes (i.e., legacy nodes) may operate only on portions of the extended channel.

Figure 4A:
FIGS. 4A-4C illustrate an example of conventional network expansion through the addition of channels.
Figure 4B:
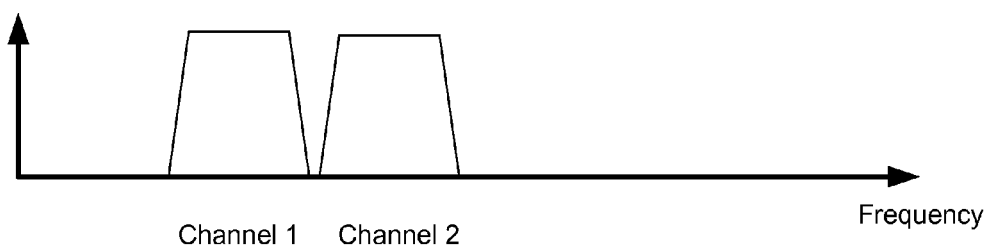
Figure 4C:
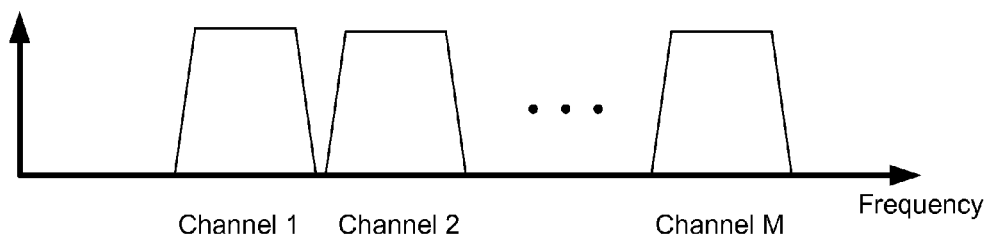

As described above, conventional systems and methods expand capacity in a network by adding channels, where between neighboring channels, frequency gaps are added. FIG. 4A illustrates an example frequency domain plot of a first channel, Channel 1, which can be, e.g., a 6 MHz channel. It should be noted that in actual/non-ideal terms, the actual spectrum usage encompasses about 5.3 MHz with a 0.7 MHz gap used as a transition or guard band for spectral shaping. FIG. 4B illustrates a second channel, Channel 2, that can be added in an effort to expand capacity of the network. As previously described and illustrated in FIG. 4B, there is a frequency gap, which following from the example of FIG. 4A, may be 0.7 MHz, that is introduced between neighboring channels, i.e., Channel 1 and Channel 2. FIG. 4C expands upon the example of FIG. 4B by illustrating that any number of channels can be added indicated by Channel M. Again, the addition of a frequency gap(s) between neighboring channels results in spectrum inefficiency.

In accordance with various embodiments, channels may be added to an existing network to increase capacity without frequency gaps, where the network can be considered to be an expanded single channel network, such as a time division duplex (TDD) system with symbol/bit timing and radio frequency (RF) synchronization between subcarriers. Zero-gap spacing can be achieved in accordance with various embodiments. by utilizing the aforementioned OFDM signaling, wherein the channels are synchronized and orthogonality is provided between subcarriers in different/adjacent (added) channels.

Figure 5A:
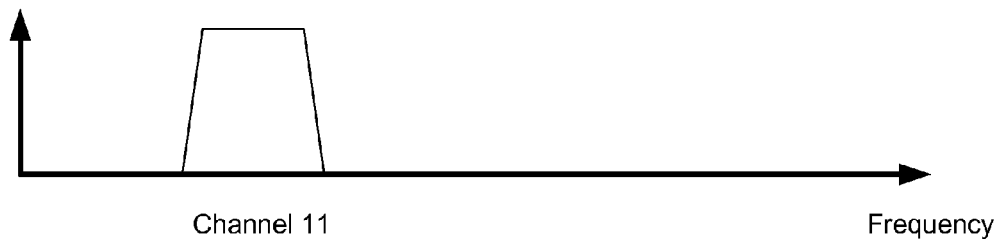
FIGS. 5A-5C illustrate an example of network expansion through the addition of channels with no frequency gaps between neighboring channels in accordance with various embodiments of the technology disclosed herein.
Figure 5B:
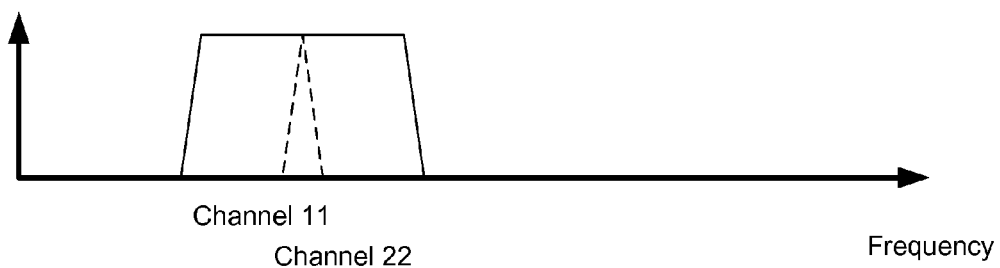
Figure 5C:
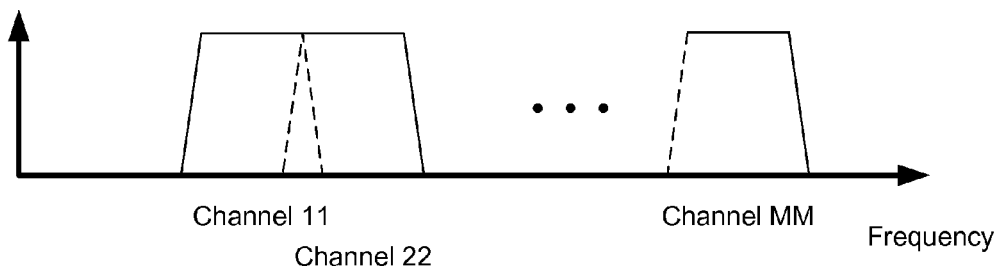

FIGS. 5A-5C illustrate examples of this zero-gap network expansion in accordance with various embodiments. FIG. 5A illustrates an example frequency domain plot of a first channel, "Channel 11", which can be, e.g., a 100 MHz channel. The actual spectrum usage may encompass the entire 100 MHz. FIG. 5B illustrates a second channel, Channel 22, that can be added when expanding capacity of the network. In contrast to the example channel addition illustrated in FIG. 4B where a frequency gap is introduced between Channel 1 and Channel 2 (e.g., 0.7 MHz with 0.35 MHz on either side of the signal, representing a significant proportion of the signal bandwidth that is wasted), FIG. 5B illustrates that Channel 22 can be added immediately next to Channel 11 without a need for any frequency gap. FIG. 5C expands upon the example of FIG. 5B by illustrating that any number of channels can be added indicated by Channel MM, where again, no frequency gap is necessary between neighboring channels. Adding channels without any frequency gap results in optimal spectral efficiency, where there is no wasted bandwidth.

It should be noted that the frequency of newly added channels, as well as their bandwidth can be arbitrary. That is, and as illustrated in FIGS. 4B, 4C, 5B, and 5C, newly added channels, e.g., Channel 2/Channel M, and Channel 22/Channel MM, are illustrated as being added as sequentially higher and higher blocks of frequencies. However, channels can be added in any desired manner. For example, an existing channel may be that of a high frequency, while one or more additional channels added to the network may be lower than the existing channel. As another example, an existing channel may reside at a frequency that is between that of added channels (e.g., one or more additional channels having a lower frequency and one or more additional channels having a higher frequency than that of the existing channel).

It should be further noted that network efficiency may also increase as more nodes and channels are added so long as the nodes can receive simultaneously on multiple channels, which can include both existing channels and added channels. Moreover, network throughput can increase as well given a greater number of nodes that are capable of receiving over these multiple channels.

As described previously, various embodiments not only provide for zero-gap channel addition, but also maintain legacy node capabilities. That is, various embodiments allow legacy nodes to continue operating despite having more limited dynamic range (being configured to operate on only a single channel). Such legacy nodes may operate at their "original" narrower frequencies (e.g., on an initial channel) without significantly taxing the overall network. This is in contrast to conventional networks that have been expanded by the addition of channels which require the use/installation of new network nodes that are capable of multi-channel operation. It should be noted that legacy nodes may be configured to operate on more than a single existing/old channel, where bit loading can be applied to the requisite existing/old channels as needed.

Referring back to FIGS. 1 and 5B, for example, Node 1 of FIG. 1 may be a legacy node, i.e., configured to operate on a single channel, such as Channel 1 of FIG. 5B. It should be appreciated that the introduction of Channel 2 to the network, substantially next to Channel 1 (without any frequency gap or band separating it from Channel 2) results in the receiver of Node 1 seeing Channel 2, and therefore, being exposed to increased power. Again, in conventional systems, the only solution to this increase in power would be to replace Node 1 with a new node that has a greater dynamic range, i.e., can operate over Channels 1 and 2. In accordance with various embodiments, however, Node 1 may still operate on Channel 1, e.g., receive and/or transmit data on Channel 1, but with slightly reduced performance to handle the higher input power from Channel 2.

For example, if Node 1 is normally capable of receiving and transmitting data at 256 QAM (i.e., 8 bits per second) on Channel 1, Node 1 can be configured to operate at 128 QAM (i.e., at 7 bits per second) when data is also being transmitted on Channel 2 (which would add 3 dB more power). By reducing the modulation on Channel 1, Node 1 may remain operational albeit at a lower quality. Here, utilizing a lower order of modulation allows Node 1 to remain operational even in view of the increased power that results from the introduction of Channel 2.

From an SNR perspective, Node 1 may operate at 256 QAM to achieve a minimum SNR of, e.g., 24 dB to maintain acceptable communications depending on a desired quality of service. When the receiver of Node 1 is exposed to the additional 3 dB of power from Channel 2, Node 1 will have to decrease its achievable SNR to 21 dB. In conventional systems, legacy Node 1 would typically be removed/replaced due to the inability to operate at the minimum 24 dB SNR. It should be noted that Node 1 still receives at a 24 dB SNR level, but it occurs on Channel 2, which it cannot operate on.

In practice, this method of operation can be achieved by adjusting the bit loading applied to a legacy channel depending on network conditions. Bit loading adapts the modulation to the conditions of the network. In accordance with bit loading, modulation using a higher constellation density is used with subcarriers that have higher SNR and modulation using a lower constellation density is used with carriers that have lower SNR. For example, lower bit loading is applied on Channel 1 and the modulation is adjusted so that, e.g., the ADC of the receiver of Node 1 has adequate dynamic range to achieve the necessary SNR on the Channel 1 to decode the modulation. At the same time, higher bit loading can be applied to other channels (e.g., Channels 2 and M) communicating to newer nodes (e.g., Nodes 2 and N) consistent with the capabilities of those newer nodes. In general, newer nodes will have a higher dynamic range for simultaneously receiving on multiple channels in order to increase network capacity.

It should be understood that so long as a legacy node, e.g., Node 1, has no data being transmitted to it, a legacy channel, e.g., Channel 1, can operate at its "original" full order of modulation (or higher if other—newer—nodes that are being communicated with at that time are capable of operating at these higher modulations levels). Additionally, and if data is only being transmitted to Node 1, (where other channels are not being transmitted over, thus not loading Node 1) Channel 1 can again operate at its full order of modulation. Hence, the only scenario in which Node 1/Channel 1 must operate using a lower order of modulation is when data being transmitted in the network includes data intended for Node 1 and transmission occurs over Channel 1 and another channel, e.g., Channel 2. Even in a scenario (that may arise in, e.g., a mesh topology where an access controller or NC is transmitting data intended for a new node, e.g., Node 2, but passes through (is forwarded via) a legacy node, e.g., Node 1, the legacy channel, e.g., Channel 1 may still operate at its full order of modulation. Further still, at times when only new (non-legacy) nodes are communicating, increased bit loading can also be applied to the legacy channel, e.g., Channel 1. Hence, the network need not experience a slowdown (consistently) thereby still increasing overall/average network capacity, where channel degradation (on average) is less than a full constellation.

Furthermore, it should be understood that with regard to the adjustment in modulation order, full (e.g., 3 dB) steps commensurate with the addition of channels are not always required. That is, when the addition of channels progress from, e.g., one to two, two to four, four to eight, and so on, power increases (as described above) by 3 dB steps (and modulation is decreased by an entire order, e.g., 256 QAM to 128 QAM, 128 QAM to 64 QAM, and so on). However, due to the multiplicity of subcarriers, intermediate steps of less than 3 dB are also possible, e.g., approximately 1.7 dB increase in power is experienced rather than a full 3 dB, for example, when adding two additional channels to an existing channel. Accordingly, modulation need not be lowered, e.g., from, e.g., 128 QAM to 64 QAM. Rather, modulation can be adjusted with finer granularity. Moreover, the channels need only operate in accordance with an averaged power increase of 1.7 dB. Accordingly, and following this example, certain subcarriers can be modulated at 128 QAM while other subcarriers can be modulated at 64 QAM.

In other words, modulation adjustment for a legacy channel need only occur when other channels are being transmitted on. Moreover, the amount of modulation adjustment can be based on the total number of channels being used.

Figure 6:
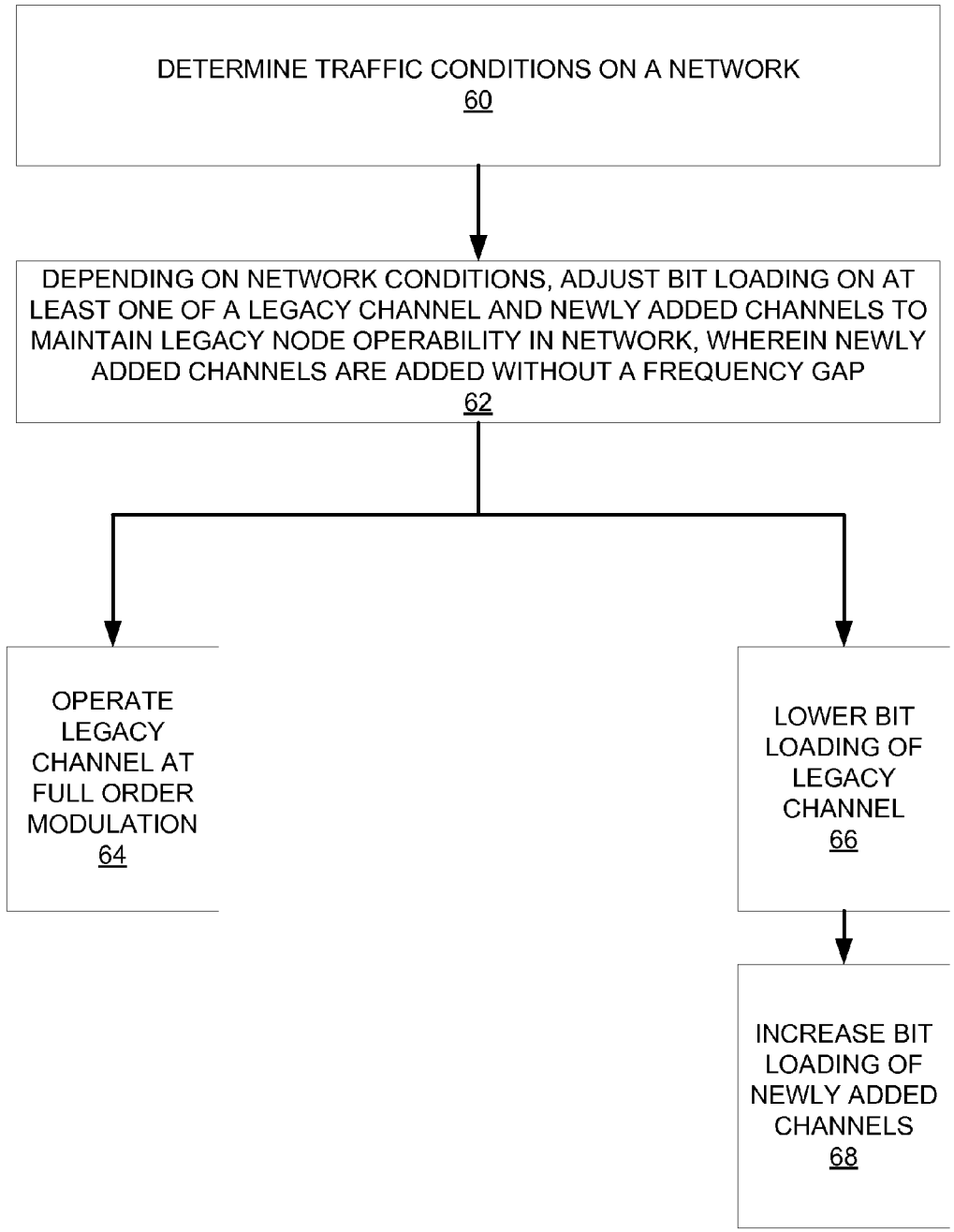
FIG. 6 is an operational flow chart illustrating example processes performed for maintaining legacy node operability in an expanded capacity network in accordance with various embodiments of the technology disclosed herein.

FIG. 6 is an operational flow chart illustrating example processes performed for maintaining legacy node operability in an expanded network having additional channels that are added without a frequency gap. At operation 60, traffic conditions on a network can be determined. As described above, network conditions can involve different channels being used to transmit data intended for different network nodes at different times. Depending on these network conditions, bit loading on at least one of a legacy channel and newly added channels is adjusted to maintain legacy node operability in the network, wherein newly added channels are added without a frequency gap at operation 62. Depending on the network conditions, the legacy channel may be operated at its full order of modulation at operation 64 (e.g., if a legacy node is not an intended recipient of transmitted data, if only the legacy channel is being transmitted over, etc.). If the legacy node is an intended recipient of data and such data is being transmitted over the legacy channel and at least one other of the newly added channels, the bit loading of the legacy channel is lowered at operation 66. That is, the legacy node can operate at, e.g., a lower order of modulation. At operation 68, bit loading on the newly added channels may also be increased.

To further optimize network efficiency, legacy nodes can be grouped together, such that data intended for the legacy nodes can be communicated at the same time, thereby maximizing the balance of time for newer nodes to receive data at higher orders of modulation/full speed. For example, and referring back to FIGS. 2 and 5B, assuming Nodes 1 and 2 are legacy nodes capable of operation on legacy Channel 1, data can be arranged in packets such that the packets intended for both Node 1 and Node 2 are transmitted over Channel 1 at the same time.

When a network is initially formed (i.e., when a new node is added to the network) or when a new network node is admitted, an admission link maintenance operation ("LMO") is performed. In accordance with the admission LMO process, the NC transmits probes to the new node. The new node receives the probes and prepares a probe report. The probe report is then sent to the NC. In addition, the new node receives probes from all of the other nodes in the network. The new node prepares probe reports for each node from which the new node received a probe. The new node also transmits probes to each of the other nodes in the network and receives probe reports from each.

In general, an LMO involves transmitting probe messages formed using a predetermined bit sequence and length. The probes are transmitted from one network node to another to estimate the characteristics of the communication link between the nodes of the network. The receiving network node measures the energy of received probes and compares the measurements against predefined thresholds to determine the number of bits per subcarrier that can be supported by the communication link. The process of specifying the bit density to be used over each subcarrier is referred to as the aforementioned bit loading.

The set of modulations used for all of the subcarriers on a link between a first node and a second node is referred to as a "modulation profile." Accordingly, the modulation profile identifies the modulation used for each subcarrier on the link from one node to another node. There is a unique modulation profile associated with the link from one node to the each other nodes. The modulation profile is not symmetrical. That is, the modulation profile used on the link from a first node to a second node may be different from the modulation profile used on the link in the other direction (i.e., from the second node to the first node). Once the admission process is complete, each node will occasionally perform a "periodic LMO."

In accordance with various embodiments, the conventional process of utilizing probes to determine network nodes' capabilities are adapted in accordance with various embodiments by testing/profiling the nodes in the presence of additional channels. That is, the aforementioned LMO process can be performed multiple times to generate multiple modulation profiles for the links. Each iteration of the LMO process can be performed subsequent to the addition of each new channel. Probes can be transmitted to obtain link characteristics between nodes when a first new channel is operational to obtain a modulation profile. Subsequent probes can be transmitted to obtain link characteristics between nodes when the first new channel and second new channel are operation to obtain another modulation profile, and so on. In this manner, a modulation profile can be obtained for each iteration/permutation of a network's capacity relative to channel utilization. Moreover, certain network node receiver designs may include different capabilities, which can be accounted for with profiling described herein. Thus, given any possible network conditions, the appropriate bit loading can be applied to the channels as may be required in order to maintain legacy node operability, i.e., the network can be dynamically optimized under varying channel loading conditions. Moreover, receivers of network nodes (legacy or otherwise) can have varying degrees of resistance to added power (via additional channels), where legacy nodes can be shifted in frequency, so to speak.

While certain embodiments have been described above in the receive/receiver context, various embodiments are now described in the transmission/transmitter context. In an orthogonal frequency division multiple access (OFDMA) communications environment, subsets of available subcarriers are assigned to network nodes for use in OFDMA communications. These networks nodes may then communicate simultaneously on their assigned subcarriers. In some embodiments, the partitioning of the available subcarriers into node-specific portions may be undertaken by an NC or access controller, for example during a node admission process (described above In some communications networks, OFDMA may be used for all transmission types, for example to allow a large number of network devices to share a common communications medium, such as in a sensor network. In other communications networks, OFDMA may be used for particular transmission types. For example, OFDMA may be used for network transmissions that are required from participating network nodes for scheduling and housekeeping purposes. Using MoCA networks as an example, OFDMA may be used to transmit RRs during an RR period of a MAP cycle, thereby reducing the duration of the RR period and freeing time for other network communications.

In general, multiple nodes may be transmitting at same time but at different frequencies in order to avoid interfering with each other. Referring back to FIGS. 2 and 5B, for example, Node 1 may be transmitting on Channel 1, Node 2 may be transmitting on Channel 2, and Node N may be transmitting on all other channels, e.g., Channels M. Assuming Node 1 is a legacy node transmitting in single channel mode, any out-of-channel emissions from Node 1 (that fall on Channel 2) can be relaxed. As would be understood, the transmission(s) of Node 1 can insert additional power into Channel 2 Recalling the profiling conducted in accordance with various embodiments, this additional power insertion at channels can be equalized, e.g., within a few dBs. Still, the receiver of Node 2 will receive some noise that includes the spillover power from the transmission(s) of Node 1 on Channel 1, which can affect available SNR at Channel 2. Accordingly, Channel 2 may also not be able to achieve a high order of modulation/high constellation density.

Figure 7:
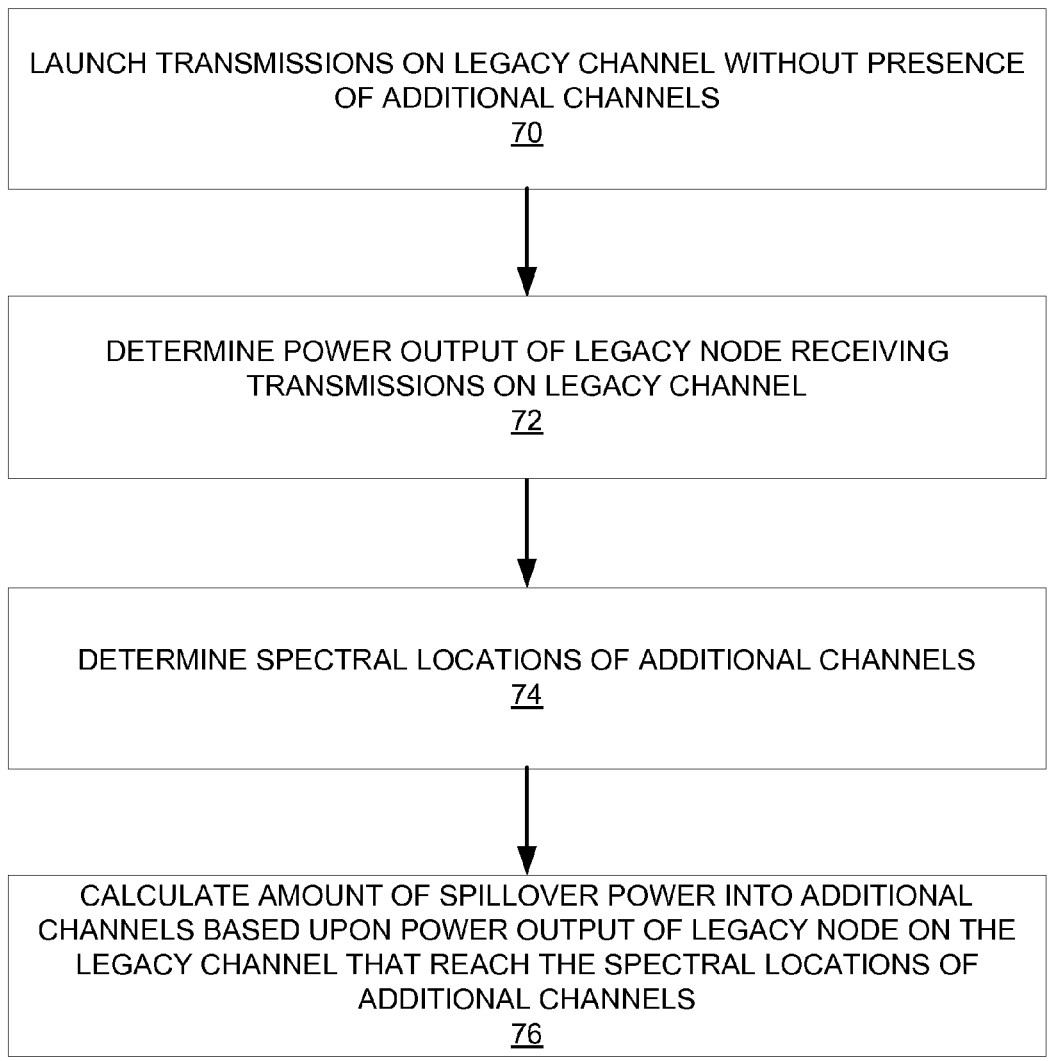
FIG. 7 is an operational flow chart illustrating example processes performed for transmission impact testing in an expanded capacity network in accordance with various embodiments of the technology disclosed herein.

In view of the above, various embodiments perform impact testing of legacy channels (in particular, their out-of-channel emissions) that spill over into newer/newly added channels and determine how much it affects constellation density. This can be addressed in conjunction with aforementioned profiling. FIG. 7 is an operational flow chart illustrating example processes performed when impact testing in accordance with various embodiments. At operation 70, transmissions are launched onto a legacy channel without the presence of additional/newly added channels. In particular, a legacy node can request transmission only on the legacy channel. At operation 72, the power output of the legacy node receiving the transmissions over the legacy channel is determined. At operation 74, the spectral location of the additional channels are determined. At operation 76, the amount of spillover power into the additional channels based upon the power output of the legacy node on the legacy channel that reach the spectral locations of the additional channels. Accordingly, the out-of-channel emissions that can potentially be inserted into the additional channels is known, and the appropriate bit loading can be determined and subsequently applied to the additional channels (e.g., lowering the order of modulation on those additional channels). This bit loading information may also be included in the aforementioned modulation profiles. Again, applicable modulations can be maximized based on the capabilities of the network, thereby improving network capacity.

Figure 8:
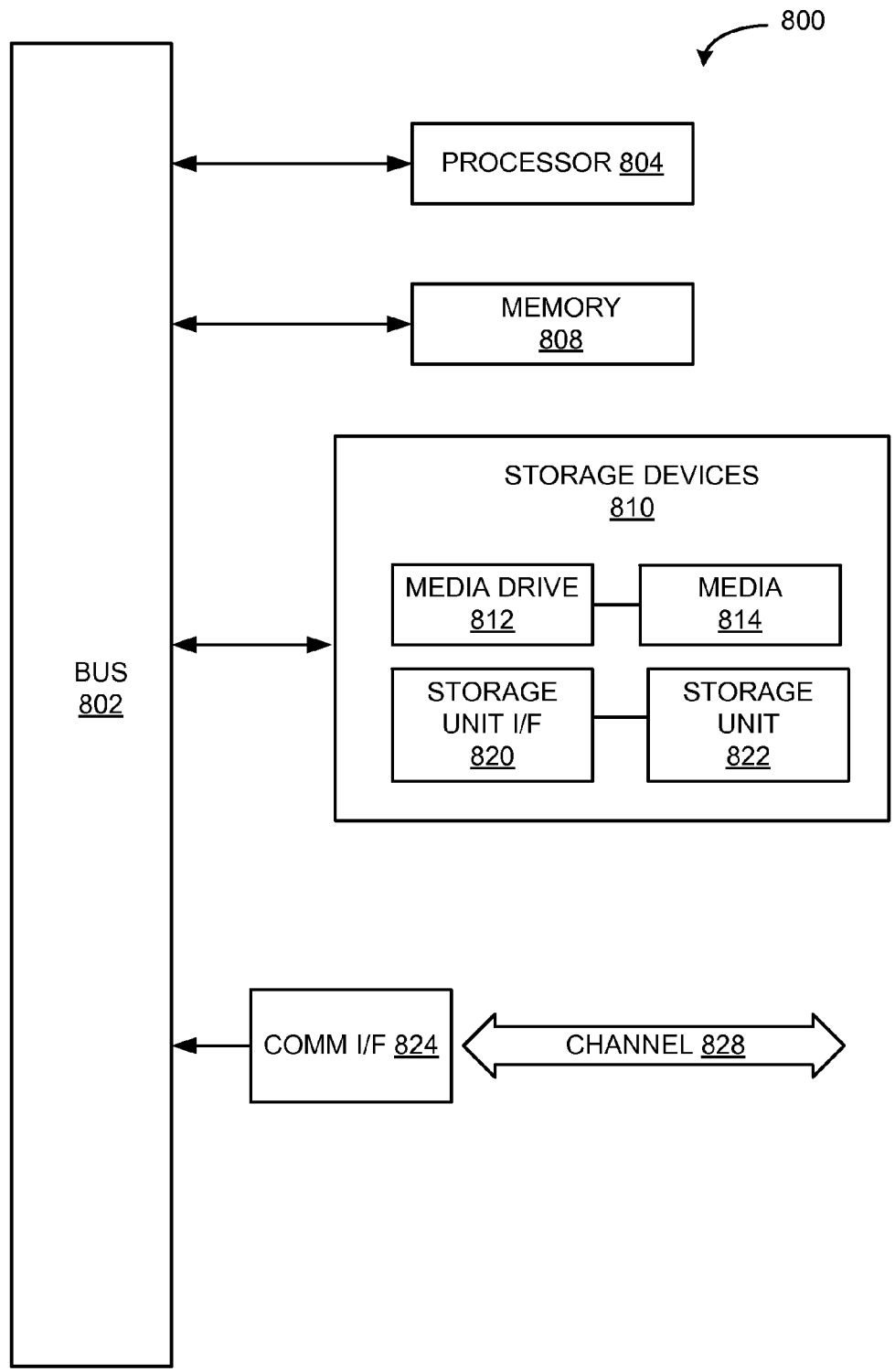
FIG. 8 illustrates an example computing module that may be used to implement various features of various embodiments of the technology disclosed herein.

FIG. 8 illustrates an example computing module that may be used to implement various features of the system and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example—computing module 800. After reading this description, it will become apparent to a person skilled in the relevant art how to implement the application using other computing modules or architectures.

Referring now to FIG. 8, computing module 800 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present application as discussed herein.

While various embodiments of the disclosed method and apparatus have been described above, it should be understood that they have been presented by way of example only, and not of limitation. Likewise, the various diagrams may depict an example architectural or other configuration for the disclosed method and apparatus, which is done to aid in understanding the features and functionality that can be included in the disclosed method and apparatus. The disclosed method and apparatus is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed:

1. A method, comprising:
   determining traffic conditions on a network;
   depending on the traffic conditions, adjusting bit loading on a legacy channel and at least one of newly added channels of the network to maintain legacy node operability in the network,
   wherein newly added channels are added without a frequency gap, and
   wherein adjusting the bit loading comprises:
      operating the legacy channel at a full order of modulation; estimating an imbalance based on a probe;
      lowering the bit loading of the legacy channel to operate at a lowered order of modulation; and
      increasing the bit loading of the newly added channels.

2. The method of claim 1, wherein the determining of the traffic conditions comprises determining whether data intended for the legacy node is being transmitted on at least one of the newly added channels.

3. The method of claim 1, wherein the full order of modulation comprises an order of modulation at which the legacy channel operates absent the presence of transmissions on the newly added channels.

4. The method of claim 1, wherein physical layer packets are transmitted in the network using orthogonal frequency division multiplexing (OFDM) for modulating data.

5. The method of claim 4, wherein the lowering of the bit loading comprises lowering the bit rate commensurate with the amount of power increase observed at the legacy node as a result of one of the newly added channels neighboring the legacy channel.

6. The method of claim 5, wherein the lowering of the bit rate comprises a full order less of modulation.

7. The method of claim 5, wherein the lowering of the bit rate comprises less than a full order less of modulation.

8. The method of claim 1, further comprising grouping packet transmissions for the legacy node and additional legacy nodes for transmission on the legacy channel.

9. The method of claim 1, further comprising determining a plurality of modulation profiles to be applied to at least one of the legacy node and newly added nodes.

10. The method of claim 9, wherein the determining of the plurality of modulation profiles comprises iteratively probing network links between the at least one of the legacy node and the newly added nodes subsequent to addition of each of the newly added channels.

11. The method of claim 1, further comprising calculating an amount of spillover power into the newly added channels based upon a power output of the legacy node on the legacy channel that reach the spectral locations of the newly added channels.

12. The method of claim 11, wherein the power output of the legacy node on the legacy channel that reaches the spectral locations of the newly added channels is determined by launching transmissions on the legacy channel of the network without the presence of additional channels to determine the power output of the legacy node receiving the transmissions on the legacy channel.

13. The method of claim 11, further comprising adjusting bit loading on at least one of the additional channels in accordance with the amount of spillover power into the additional channels.

14. The method of claim 13, wherein the adjusting of the bit loading comprises lowering the bit loading of the at least one of the additional channels to operate at a lowered order of modulation.

15. The method of claim 13, wherein the adjusting of the bit loading is performed in accordance with one of a plurality of modulation profiles applicable to the at least one of the additional channels.

16. The method of claim 15, wherein the one of the plurality of modulation profiles is determined by iteratively probing network links between the at least one of the legacy node and newly added nodes subsequent to addition of each of the additional channels.

* * * * *